3,752,815
Patented Aug. 14, 1973

3,752,815
LYSERGIC ACID N-NICOTINOYL PIPERAZIDE
Peter Stutz, Basel, Switzerland, assignor to Sandoz Ltd. (also known as Sandoz AG), Basel, Switzerland
No Drawing. Filed Sept. 4, 1970, Ser. No. 69,930
Claims priority, application Switzerland, Sept. 10, 1969, 13,651/69, 13,652/69
Int. Cl. C07d 51/70
U.S. Cl. 260—268 PE    1 Claim

ABSTRACT OF THE DISCLOSURE

The present invention concerns the novel heterocyclic compound of the formula:

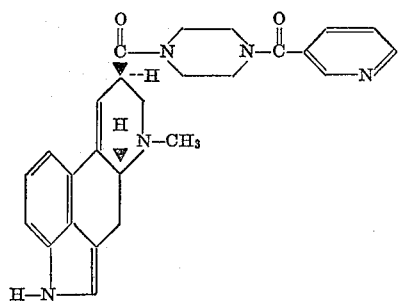

and pharmaceutically acceptable acid addition salts thereof.

The compounds are useful in the treatment of conditions of orthostasis and hypertonia, and are also salidiuretics, anti-phlogistics and edema-inhibitors.

---

The present invention provides the new heterocyclic compound of Formula I,

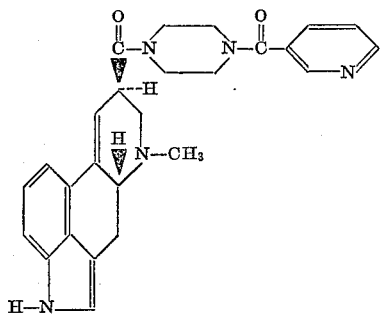

and acid addition salts thereof.

In accordance with the invention, the compound of Formula I or an acid addition salt thereof is obtained by:

(a) Reacting a reactive derivative of the acid of Formula II

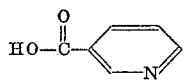

with a compound of Formula III,

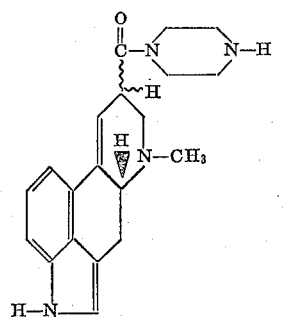

in an inert organic solvent, and in the presence of a basic condensation agent, or (b) Reacting a reactive derivative of the acid of Formula IV

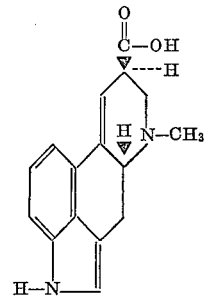

with the compound of Formula V,

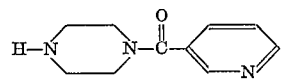

or an acid addition salt thereof, in an inert organic solvent, and in the presence of a basic condensation agent, and where an acid addition salt of a resulting free base is required, converting the base into such salt.

Examples of reactive derivatives of the acid of Formula II which may be used in process (a) are: the reaction product obtained by reaction of the acid of Formula II with a chlorinating or brominating agent and an N-di(lower)alkyl-substituted acid amide of an aliphatic monocarboxylic acid having 1 to 3 carbon atoms, the acid chloride hydrochloride, or the addition product of the acid of Formula II with dicyclohexyl carbodiimide.

Examples of solvents which may be used in process (a) are: methylene chloride, chloroform, acetonitrile and dimethyl formamide, or mixtures thereof. Pyridine, triethyl amine, or inorganic compounds such as potassium carbonate may, for example, be used as the basic condensation agent.

The reaction of the invention in accordance with process (a) is preferably effected at a temperature between about —20° and +30° C. The reaction period amounts to about ½ to 5 hours, depending on the reaction temperature used.

Examples of reactive derivatives of the acid of Formula IV which may be used in process (b) are: the reaction product obtained by reaction of the acid of Formula IV with a chlorinating or brominating agent and an N-di(lower)alkyl-substituted acid amide of an aliphatic monocarboxylic acid having 1 to 3 carbon atoms, the acid chloride hydrochloride, or the mixed anhydride with sulphuric acid or trifluoroacetic acid. Examples of chlorinating or brominating agents which may be used for this reaction, as well as for the production of the reactive derivatives of the acid of Formula II in accordance with process (a) are: oxalyl chloride, thionyl chloride, phosgene, phosphorus oxychloride and phosphorus oxybromide. Dimethyl formamide or dimethyl acetamide may, for example, be used as N-di(lower)alkyl - substituted acid amide of an aliphatic monocarboxylic acid having 1 to 3 carbon atoms.

Examples of solvents which may be used in process (b) are: methylene chloride, chloroform, acetonitrile and dimethyl formamide, or mixtures thereof. Pyridine, triethyl amine, or an excess of the compound of Formula V may, for example, be used as the basic condensation agent.

The reaction of the invention in accordance with process (b) is preferably effected at a temperature of between about —10° and +20° C., conveniently at about 0° C. The reaction period amounts to about ½ to 5 hours, depending on the reaction temperature used.

Working up of the reaction solution obtained in accordance with process (a) or (b) may, for example, be effected by extraction of the reaction solution with an aqeous 2 N soda solution and an organic solvent. The compound of Formula I may be isolated by chromatography.

The compounds of Formula III, used as starting materials in process (a), may be obtained by reacting a reactive derivative of the acid of Formula IV with a large excess of piperazine, which simultaneously serves as basic condensation agent. The resulting reaction product may be employed for further reaction without separation of the isomers.

The nicotinoyl piperazine (Formula V), used as starting material in process (b), may be obtained by reacting a compound of Formula VI,

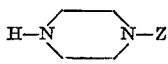
VI wherein Z is a known protective radical for amino groups, e.g. the trityl radical, with a reactive derivative of the compound of Formula II, e.g. the acid chloride, in the presence of a basic condensation agent, e.g. pyridine, and subsequently removing the protective radical from the resulting reaction product, e.g. with hydrochloric acid in methanol.

The compounds of Formula VI may be obtained in accordance with the invention by reacting a large excess of piperazine with a reactive derivative of a compound of Formula VII, $$HO-Z \quad (VII)$$

wherein Z is as defined above, and isolating the resulting compounds of Formula VI in conventional manner.

The compound of Formula I produced in accordance with the invention forms stable salts which are usually crystalline at room temperature with organic or inorganic acids. The following acids may, inter alia, be used for salt formation: hydrochloric acid, sulphuric acid, phosphoric acid, tartaric acid, maleic acid and methanesulphonic acid.

The compound of Formula I and pharmaceutically acceptable acid addition salts thereof are useful because they possess pharmacological activity in animals. More particularly, the compounds are useful in the treatment of conditions of orthostasis and hypertonia, as indicated by central circulatory tests in narcotized animals (cats and dogs). Thus, the compounds cause hypotension and bradycardia, potentiate the effects of noradrenaline and tyramine, inhibit carotid occlusion reflex, and potentiate tachycardia caused by isoproterenol. The dosage administered will naturally vary depending on the mode of administration and treatment desired. However, in general, satisfactory results are obtained at daily dosages of from about 0.02 to about 15 mg./kg. animal body weight, conveniently given in divided doses two to three times a day, or in sustained release form. For the larger mammals, the total daily dosage is from about 2 to about 100 mg., and dosage forms suitable for oral administration comprise from about 0.3 to about 50 mg. of the compound, in association with a solid or liquid pharmaceutical carrier or diluent.

The Compound I and pharmaceutically acceptable acid addition salts thereof are furthermore useful salidiuretics as indicated by the diuresis test in the wake rat, satisfactory results being obtained at doses between about 0.15 and 30 mg./kg. animal body weight, conveniently given in divided doses two to three times a day or in sustained release form. For the larger mammals, the total daily dose is in the range of from about 10 to 500 mg., and dosage forms suitable for oral administration comprise from about 3 to about 250 mg. of the compound, in association with a solid or liquid pharmaceutical carrier or diluent.

Still further, the compound of Formula I and pharmaceutically acceptable acid addition salts are useful antiphlogistics and edema-inhibitors as indicated by the Carrageen edema test in rats. As before, the dosage administered will naturally vary depending on the mode of administration and treatment desired. However, for this use, satisfactory results are obtained at a daily dose of from about 0.15 to about 10 mg./kg. animal body weight, dosages for larger mammals amounting to from about 10 to about 500 mg. Dosage forms suitable for oral administration comprise from about 3 to about 250 milligrams of the compound, admixed with a solid or liquid pharmaceutical carrier or diluent.

The Compound I and acid addition salts thereof furthermore exhibit various central nervous system depressant effects.

In the following examples, which illustrate the invention without in any way limiting its scope, all temperatures are indicated in degrees centigrade and are uncorrected. Insofar as the production of the starting materials is not described, these are known or may be produced in accordance with known processes or in a manner analogous to known processes.

EXAMPLE 1 d-Lysergic acid N-nicotinoyl piperazide
[process (a)]

12.6 g. (0.1 mol) of oxalyl chloride in 10 cc. of absolute acetonitrile are added dropwise within 10 minutes to a stirred mixture cooled to $-15°$ to 77 cc. of absolute dimethyl formamide and 150 cc. of absolute acetonitrile, whereby a constant temperature is maintained.

The resulting crystalline precipitate is stirred at $-10°$ for a further 5 minutes. 27 g. (0.1 mol) of dry d-lysergic acid are subsequently added, 86 g. (1 mol) of anhydrous piperazine are rapidly added with strong cooling, and the mixture is vigorously stirred at 0° for 4 hours. After extracting between 2 N soda/10% methanol in methylene chloride until a negative Keller reaction is obtained, drying the combined organic phases and evaporating the solvent, a polar crude base is obtained, which is dissolved in 150 cc. of absolute pyridine. After the slow addition of 16 g. of nicotinoyl chloride.HCl while stirring well at room temperature, the reaction is completed after 60 minutes. Working up is effected between 10% methanol/methylene chloride and a 2 N soda solution, and after drying and removing the organic solvent by distillation the crude base is obtained which is immediately chromatographed on a 50-fold quantity of Alox II–III.

The pure amorphous d-lysergic acid N-nicotinoyl piperazide is eluted with 0.5% of methanol in methylene chloride, whereas elution with 0.7% of methanol yields a mixed fraction between the title compound and the d-isolysergic acid form, which may be isomerized in dimethyl formamide/triethyl amine mixtures at 100° until a constant equilibrium of about 6:4 is obtained, whereby the yield is accordingly increased.

Maleate.—From absolute ethanol and a twofold molar amount of maleic acid after heating. M.P. 198–200° (decomp.), $[\alpha]_D^{20} = -12°$ (c.=1 in methylene chloride/methanol 1:1).

EXAMPLE 2 d-Lysergic acid N-nicotinoyl piperazide [process (b)]

A solution of 1.27 g. (10 millimols) of oxalyl chloride in 5 cc. of absolute acetonitrile is added dropwise within 5 minutes to a stirred mixture, cooled to $-10°$, of 10 cc. of absolute dimethyl formamide and 20 cc. of absolute acetonitrille. 2.68 g. of anhydrous d-lysergic acid are rapidly added at the same temperature to the resulting suspension, a solution of 1.91 g. (10 millimols) of N-nicotinoyl piperazine in 5 cc. of absolute pyridine is subsequently allowed to flow in with good cooling, and the reaction mixture is stirred at 0° for a further 3 hours.

Working up is effected by diluting the mixture with 100 cc. of methylene chloride and 50 cc. of an aqueous 2 N soda solution, shaking, separating the organic phase and extracting the aqueous phase thrice with 50 cc. amounts of methylene chloride. After drying the combined organic phase over sodium sulphate and evaporating the solvent in a vacuum a brown foam is obtained which is chromatographed on a 60-fold amount of aluminium oxide of activity II. The title compound is eluted as a yellowish foam with 0.5% of methanol in methylene chloride.

The N-nicotinoyl-piperazine, used as starting material, may, for example, be obtained as follows:

(a) N-trityl-piperazine.—A stirred suspension of 25.8 g. (0.3 mol) of technical piperazine in 30 cc. of acetonitrile and 8.55 cc. of glacial acetic acid (0.15 mol) is converted into a solution at 50° by the addition of 16 cc. of water. 8.34 g. (0.03 mol) of trityl chloride in 45 cc. of acetone are subsequently added dropwise within 5 minutes, and the mixture is vigorously stirred at this temperature for 3 hours. Working up is effected by diluting with semi-saturated, aqueous potash solution and extracting several times with ether, whereby unconverted piperazine remains as third phase and after cooling is recovered as crystalline hexahydrate and may be used for the next reaction.

The ether phase is dried over potash. After evaporating the solvent, a crystalline residue is obtained which in accordance with the thin layer chromatogram with 10% methanol/methylene chloride; silica gel G, is about 98% pure N-trityl-piperazine which is immediately used for the next reaction.

(b) N - nicotinoyl - N' - trityl - piperazine.—8.7 g. (about 26.5 millimols) of the N-trityl-piperazine obtained in accordance with stage (a) are suspended in 30 cc. of absolute pyridine, 8.7 g. of nicotinic acid chloride. HCl (48.8 millimols) are added at 0°, and the mixture is stirred at room temperature for 1 hour. The reddish suspension is concentrated in a vacuum and is thoroughly extracted between semi-saturated, aqueous potash solution and ether. The combined organic phases are washed with 1 N hydrochloric acid and subsequently with a saturated sodium bicarbonate solution, are dried over sodium sulphate and concentrated by evaporation. A beige, crystalline residue of N-nicotinoyl-N'-trityl-piperazine is obtained which may be immediately used for the next reaction. Light beige crystals of the title compound, having a M.P. of 230–232°, are obtained from 50 cc. of methyl ethyl ketone.

(c) N-nicotinoyl-piperazine.—9.8 g. of the crude product obtained in accordance with stage (b) (about 20 millimols) are dissolved in 80 cc. of methanol containing 60 millimols of HCl gas, and this is stirred at 50° for 1½ hours. After evaporating the solvent the dihydrochloride of the title compound crystallizes by taking up the residue in absolute ethanol. M.P. 210° (decomp. in the sealed tube). N-nicotinoyl-piperazine is pure in accordance with the thin layer chromatogram on silica gel G with 15% methanol/methylene chloride.

What is claimed is:

1. The compound of the formula:

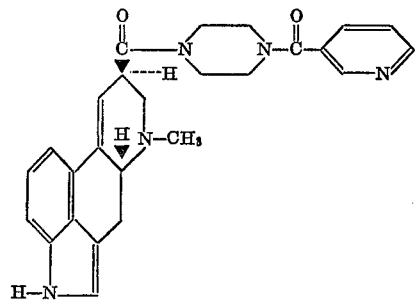

or a pharmaceutically acceptable acid addition salt thereof.

References Cited

UNITED STATES PATENTS

| | | | |
|---|---|---|---|
| 2,997,470 | 8/1961 | Pioch | 260—268 PE |
| 3,592,816 | 7/1971 | Troxler | 260—268 PE |

FOREIGN PATENTS

| | | | |
|---|---|---|---|
| 1,188,197 | 4/1970 | Great Britain | 260—268 PE |

DONALD G. DAUS, Primary Examiner

U.S. Cl. X.R.

424—250, 261; 260—268 C, 285.5